United States Patent
Sebetlela et al.

(10) Patent No.: US 11,811,183 B2
(45) Date of Patent: Nov. 7, 2023

(54) CONNECTION ARRANGEMENT AND METHOD FOR MANUFACTURING A CONNECTION ARRANGEMENT

(71) Applicant: Auto-Kabel Management GmbH, Hausen i.W. (DE)

(72) Inventors: Kabelo Sebetlela, Berlin (DE); Urszula Bitner, Berlin (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/923,458

(22) PCT Filed: Apr. 21, 2021

(86) PCT No.: PCT/EP2021/060325
§ 371 (c)(1),
(2) Date: Nov. 4, 2022

(87) PCT Pub. No.: WO2021/224002
PCT Pub. Date: Nov. 11, 2021

(65) Prior Publication Data
US 2023/0198176 A1 Jun. 22, 2023

(30) Foreign Application Priority Data
May 5, 2020 (DE) ...................... 10 2020 112 051.6

(51) Int. Cl.
*H01R 13/46* (2006.01)
*H01R 4/62* (2006.01)
(Continued)

(52) U.S. Cl.
CPC ........... *H01R 4/625* (2013.01); *B23K 20/122* (2013.01); *H01R 4/029* (2013.01);
(Continued)

(58) Field of Classification Search
CPC .... H01R 4/625; H01R 4/029; B23K 2103/22; B23K 2101/38; B23K 20/122; B23K 43/0207
See application file for complete search history.

(56) References Cited

U.S. PATENT DOCUMENTS 6,135,818 A * 10/2000 Lang .................. H01R 13/6592
439/607.41
6,352,193 B1 * 3/2002 Bellino .............. B23K 20/1255
228/2.1
(Continued)

FOREIGN PATENT DOCUMENTS

DE 102018206620 A1 10/2018
DE 102018101990 A1 8/2019
(Continued)

OTHER PUBLICATIONS

International Searching Authority/EP, International Search Report and Written Opinion of the International Searching Authority, Application No. PCT/EP2021/060325, dated Jul. 8, 2021, 11 pages.
(Continued)

*Primary Examiner* — Phuong Chi Thi Nguyen
(74) *Attorney, Agent, or Firm* — Sunstein LLP

(57) ABSTRACT

A connection arrangement comprising a metallic flat conductor having an at least quadrangular cross-sectional profile and at least two mutually opposing first and second surfaces extending at least partially parallel to one another in the longitudinal direction, at least two parts which are flat in the overlap region and which are formed as connecting lugs and which rest on the first surface with an overlap joint and project beyond one or both longitudinal edges of the flat conductor, characterized in that a metallic friction stir welded joint zone is formed starting from the second surface
(Continued)

through the flat conductor towards the first surface and projecting into the connecting lugs.

14 Claims, 7 Drawing Sheets

(51) Int. Cl.
    *H01R 43/02*     (2006.01)
    *H01R 4/02*     (2006.01)
    *B23K 20/12*     (2006.01)
    *B23K 103/12*     (2006.01)
    *B23K 101/38*     (2006.01)
    *B23K 103/10*     (2006.01)

(52) U.S. Cl.
    CPC ...... *H01R 43/0207* (2013.01); *B23K 2101/38* (2018.08); *B23K 2103/10* (2018.08); *B23K 2103/12* (2018.08)

(56) References Cited

U.S. PATENT DOCUMENTS

| | | | | |
|---|---|---|---|---|
| 6,619,987 B2* | 9/2003 | Kumamoto | ......... | H01R 13/512 439/947 |
| 6,764,342 B2* | 7/2004 | Murayama | ....... | H01R 13/65918 439/607.1 |
| 8,128,440 B2* | 3/2012 | Matsumoto | ............ | B60L 53/16 439/731 |
| 9,166,326 B1* | 10/2015 | Billman | ................ | H01R 13/44 |

FOREIGN PATENT DOCUMENTS

| EP | 3609023 | A1 | 2/2020 |
|---|---|---|---|
| JP | 3823780 | B2 | 9/2006 |
| WO | 2018219515 | A1 | 12/2018 |
| WO | 2019154506 | A1 | 8/2019 |

OTHER PUBLICATIONS

German Patent Office, Office Action that issued on priority Application No. 10 2020 112 051.6, dated Apr. 7, 2021, 4 pages (in German).

European Patent Office, Office Action, Application No. 21720730.7, dated Jun. 27, 2023, 5 pages (in German).

\* cited by examiner

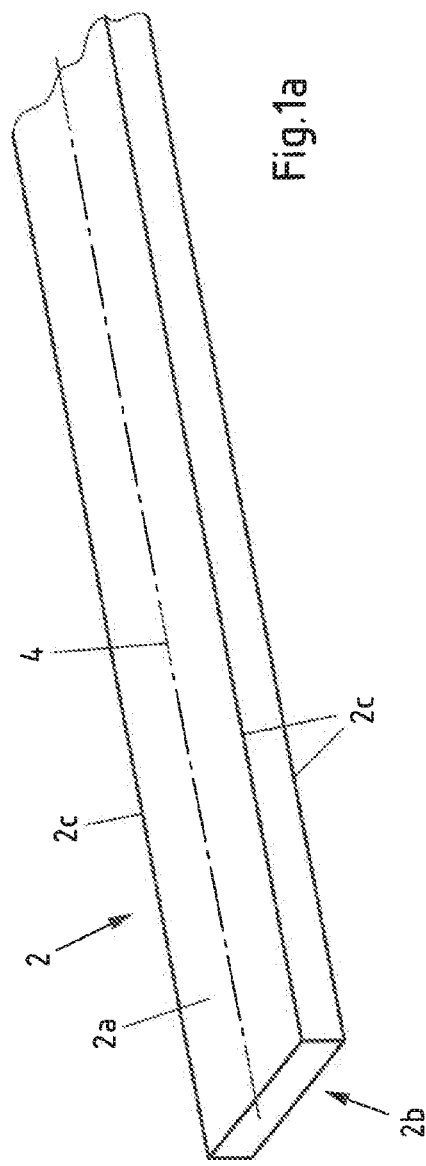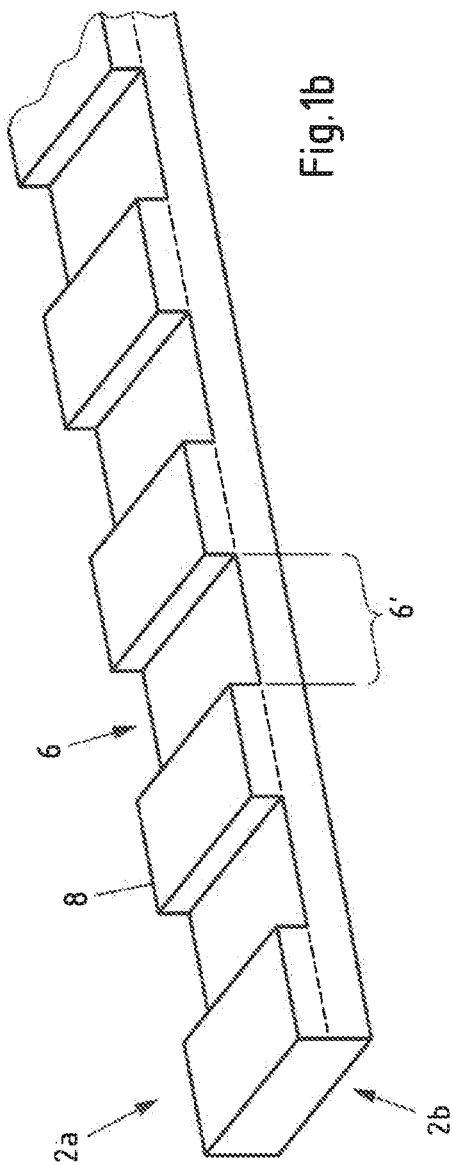

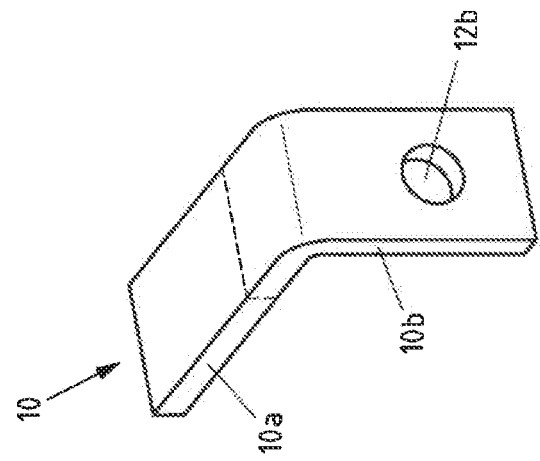
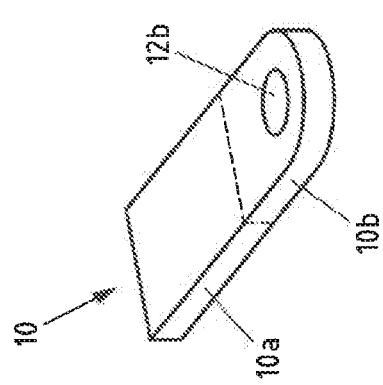
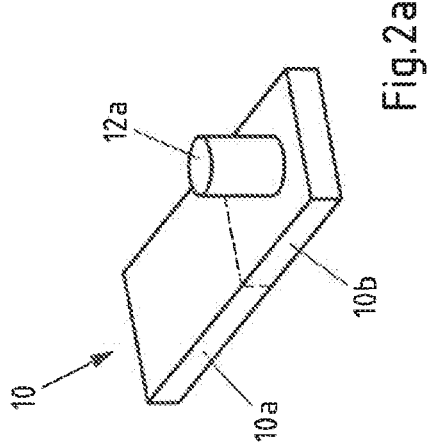
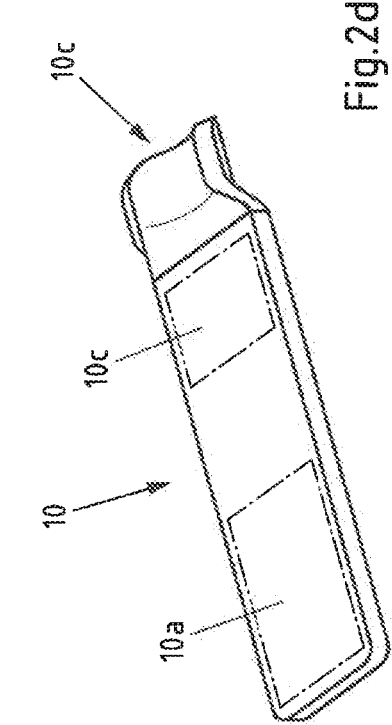

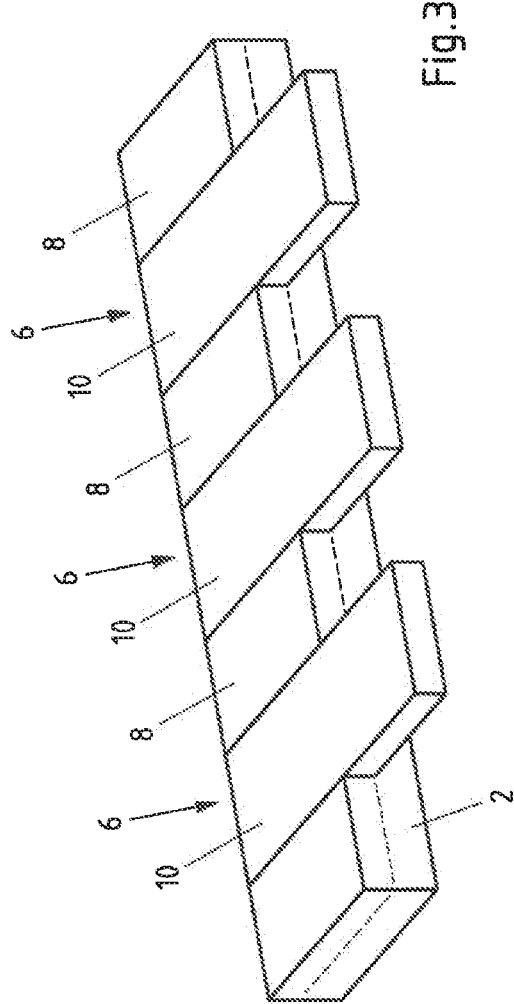

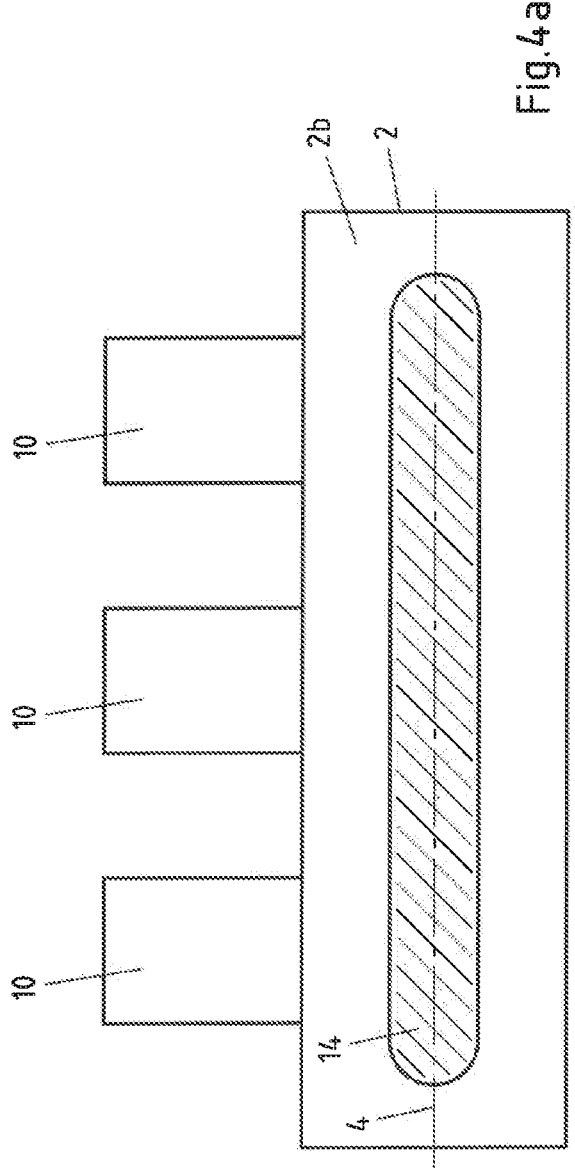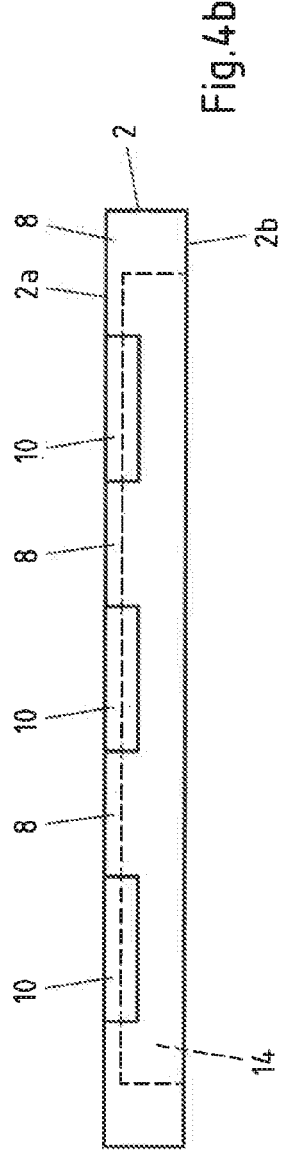

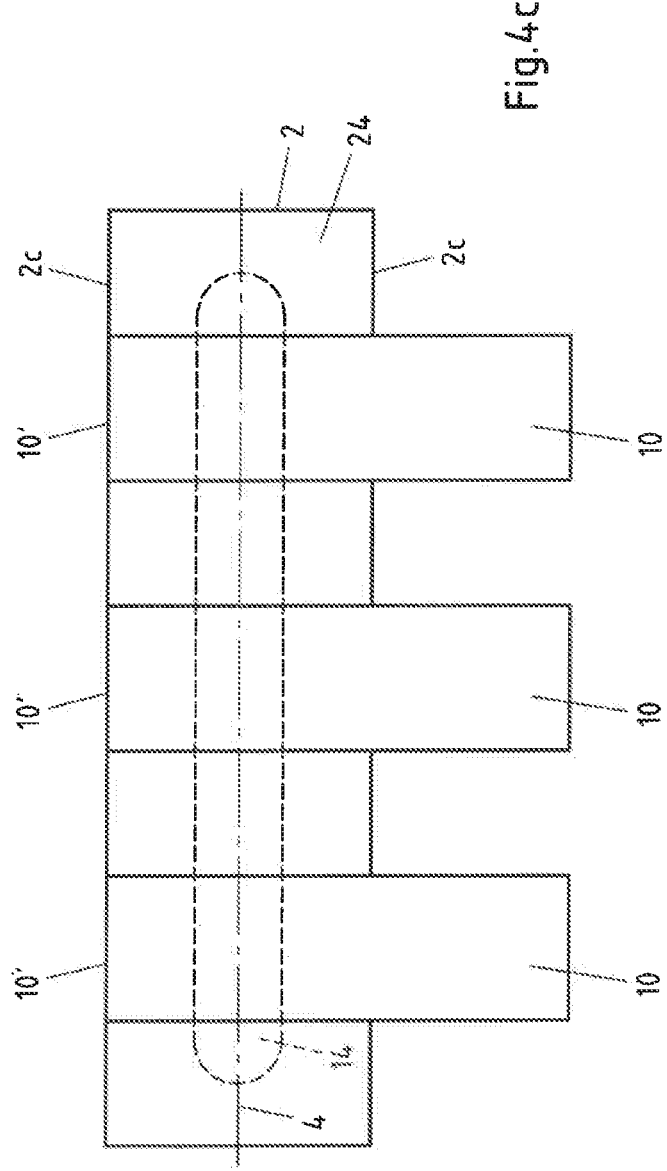

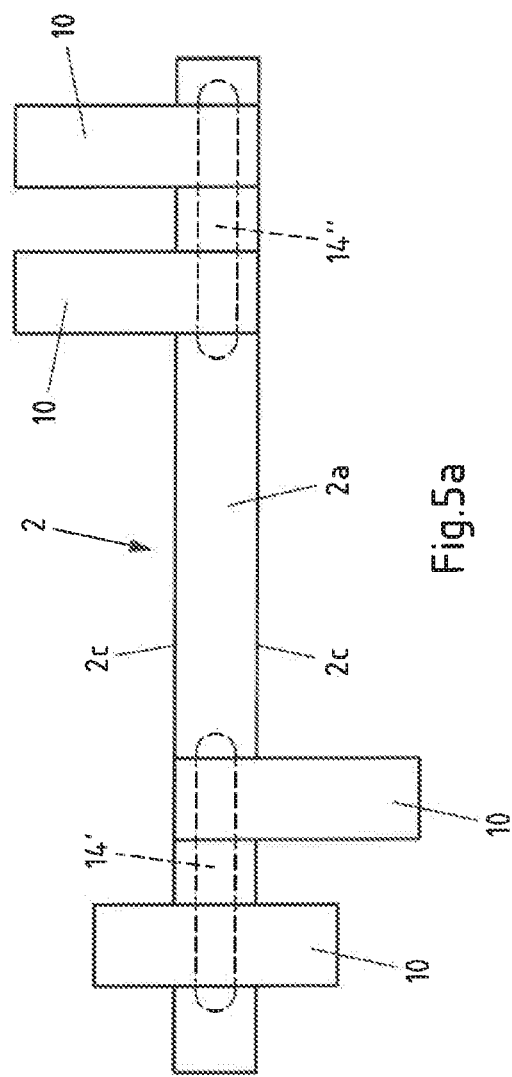
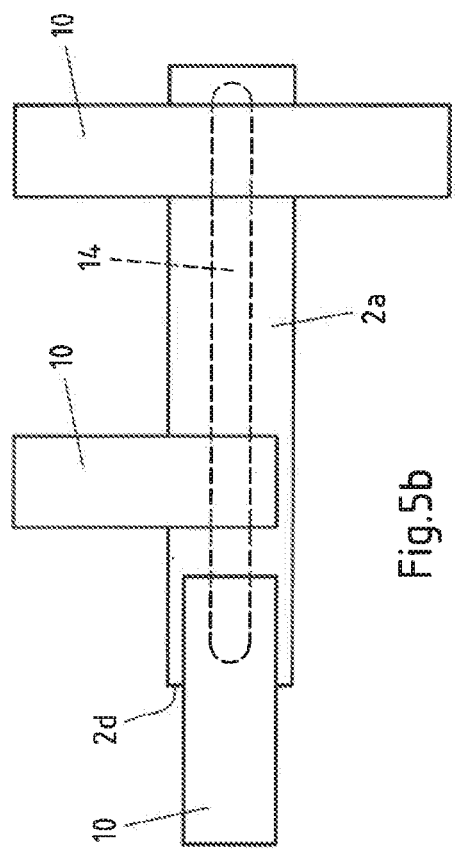

CONNECTION ARRANGEMENT AND METHOD FOR MANUFACTURING A CONNECTION ARRANGEMENT

CROSS-REFERENCE TO RELATED APPLICATIONS

This application is the national phase entry of international patent application no. PCT/EP2021/060325 filed Apr. 21, 2021 and claims the benefit of German patent application No. 10 2020 112 051.6 filed May 5, 2020, the disclosures of which are incorporated herein by reference in their entirety.

TECHNICAL FIELD

The subject matter relates to a connection arrangement for flat electrical conductors, in particular in automotive applications, and a method of manufacturing such a connection arrangement.

BACKGROUND ART

Electrical flat conductors, so-called busbars, can be made of aluminum, aluminum alloy, copper or copper alloy. These flat conductors serve, for example, as so-called energy backbones for the distribution of electrical energy in vehicles, as battery cell connectors and/or as module connectors. In some cases, several electrical outlets are to be realized along the flat conductor, which are nowadays frequently formed as connection lugs.

If these electrical outlets are made of a different metallic material than the flat conductor, the result is a so-called mixed flat cable made of different metallic materials. Connecting these different metallic materials, especially if aluminum is one of these materials, is problematic with regard to the transition resistance at the connection point.

To realize an electrically advantageous electrical transition between the flat conductor and the connection lug, ultrasonic welding is proposed, for example. In ultrasonic welding, a welding energy is introduced into the joining partners by means of ultrasound via a welding tool. These begin to vibrate and their relative movement to one another results in an input of welding energy at the transition point, subsequent melting of the joining partners and thus an intermetallic, materially bonded joint.

Ultrasonic welding is a preferred welding process for producing intermetallic joints of dissimilar metals. However, this process has disadvantages if several intermetallic joints have to be formed spatially adjacent to each other along the flat conductor between the flat conductor and a respective connecting lug. Since, after a first connection plate has been welded on, the sonotrode of the ultrasonic welding tool imparts ultrasonic vibrations to the joining partners when a further connection plate is welded on, the vibration can damage the previously produced intermetallic, materially bonded joint between the flat conductor and connection plate. The cooled, hardened welded joint can develop cracks, microcracks or other damage, so that the previously perfect welded joint is damaged by the application of welding energy for the next welded joint.

For this reason, the subject matter was based on the object of providing a connection arrangement in which a plurality of connection lugs can be arranged on a flat conductor in a permanently stable manner.

SUMMARY OF THE INVENTION

The present connection arrangement comprises a flat conductor. This flat conductor may be formed from a metallic metal, for example aluminum or an aluminum alloy, and copper or a copper alloy.

The connection arrangement can be arranged in a spatially delimited area of the flat conductor or extend over an entire flat conductor. Also, two or more connection arrangements may be provided adjacent to each other on the flat conductor. In this case, the flat conductor can be formed as a busbar, in particular as an energy backbone. Also, the flat conductor may be formed as a battery cell connector or battery module connector.

The flat conductor has an at least square cross-sectional profile, in particular a square or rectangular cross-sectional profile. In this cross-sectional profile, the flat conductor has at least two opposing first and second surfaces that are at least partially parallel to each other in the longitudinal direction. The first and second surfaces may be the wide sides in a rectangular cross-sectional profile.

Connecting lugs are arranged on the flat conductor in the present disclosure. The connection lugs can also be formed as a flat part, for example, and have an equally square, in particular rectangular or square, cross-sectional profile, in particular in the region of the joining surface. However, the connection lugs can also be formed as connection lugs, crimp connections or the like. In particular, a connection lug may be formed from a flat area and a profiled area. These areas can be provided at distal ends of the connection lug. Also, the flat area may be surrounded on both sides by profiled areas, and the profiled areas may extend beyond the flat conductor. The profiled area may be formed on arcuate receptacles for receiving a round cable.

The connection lugs can have at least one contact area, in particular adjacent to the profiled area. The contact area is used for contacting with a conductor (stranded conductor or solid material). For this purpose, the contact area can be coated, in particular nickel-plated and/or tin-plated, for example, so that a conductor can be soldered on. The conductor can also be welded on, in particular by means of ultrasonic welding or resistance welding. Also, the contact area may have a relief-shaped surface to optimize welding. The flat area may be in the region of an overlap with the flat conductor.

The connection lugs are formed in particular from a sheet, in particular as a stamped or stamped-bent part. The connection lugs are placed with an overlap, in particular an overlap joint, on the first surface of the flat conductor. With this overlap, a part (overlap area) of a surface of the connection tab lies on the first surface of the flat conductor and another part extends beyond a longitudinal edge of the flat conductor.

The connection lugs are adjacent to each other in the longitudinal direction of the flat conductor, but are preferably spaced apart in this regard.

The connection lugs may have a connection, in particular in the contact area, to a conductor at one or both ends. This pre-existing connection can be obtained by means of ultrasonic welding, friction welding, resistance welding or laser welding, among others.

It is important here that the pre-existing connection is not located in the overlap area of the connection lug with the flat conductor.

It is now proposed that a metallic friction stir weld joint zone is formed starting from the second surface through the flat conductor to the first surface and projecting into the connection lugs. A continuous friction stir weld zone extends through the flat conductor between the two surfaces and into the overlap region where the connection lugs rest on the first surface, also into the connection lugs. A friction stir weld zone thus extends continuously along the longitudinal direction of the flat conductor and through the flat conductor into the connection lugs. It is thus possible to join a plurality of connection lugs to the flat conductor in a single friction stir welding process. The joint formed is permanently stable and intermetallic.

During joining, contact pressure is applied to the second surface and, together with a rotating welding rod, the flat conductor is plasticized from the second surface towards the first surface. The stirring further plasticizes the connection lugs adjacent to the first surface, at least in part. Thus, both the material of the flat conductor and the material of the respective connection lug are plasticized, and the materials as well as partially mixed. A material-to-material bond is formed between the two joining partners.

In friction stir welding, a special friction stir welding machine or a CNC machine is used to press the flat conductor against the connecting lugs. This can be done with the help of the friction stir welding tool and its shaft. A friction welding rod, also called a pin, is rotated or oscillated in the shaft and pressed onto the second surface. It is also possible for the entire friction stir welding tool, consisting of a shank and a pin, to be set in rotational motion. The friction welding rod applies the friction welding energy to the flat conductor and the connection lug, causing the metallic materials to plasticize and intermetallically bond. In a continuous joining zone, only one immersion point and one exit point of the rod are formed along the flat conductor via the plurality of connection lugs. Otherwise, the friction stir welding tool travels in a continuous, preferably transverse, motion along the longitudinal axis of the flat conductor on the second surface. Nevertheless, it is possible to produce several seams next to each other in the case of larger distances between the lugs within a flat conductor. In this regard, it should be noted that a weld seam connects the flat conductor to at least two connecting lugs.

According to one embodiment, it is proposed that the friction stir weld joint zone is formed from material of the flat conductor and the connecting lugs plasticized during joining. In the area along the longitudinal axis of the flat conductor, in which the connection lug rests on the first surface, both the material of the flat conductor and the material of the connection lug are plasticized. In the areas where the connection lug is not in contact, only the flat conductor can plasticize.

According to one embodiment, it is proposed that the metallic joining zone in the flat conductor is formed continuously along its longitudinal axis via at least two connecting lugs. The connection lugs lie on the first surface spaced apart from each other on the flat conductor. Starting from the second surface, the joining zone is introduced into the flat conductor and the connecting lugs. The joining zone extends along the longitudinal axis of the flat conductor over at least two of the connection lugs. Also, a plurality of spaced apart joining zones may be formed along the longitudinal axis of the flat conductor.

According to one embodiment, it is proposed that the flat conductor is continuously plasticized along its longitudinal axis along the friction stir weld joining zone during joining, and that the connecting lugs abut the flat conductor in the joining zone at spatial intervals from one another. The joining zone is continuous in the flat conductor and intermittently merges into one of the connecting lugs in each case. A gap is preferably formed between two connecting lugs.

As already explained at the beginning, the flat conductor and connection lugs are preferably formed from mutually different metallic materials. This can be useful, for example, if the flat conductor is formed from aluminum or an aluminum material and the connection lugs are formed from copper or a copper material. The connection lugs can form electrical outlets, for example for a crimp connection, a screw connection, a weld connection or the like. Conventional cables, in particular copper cables, can be arranged on the connection lugs. In order to enable a homogeneous connection between the connection lugs and the connected cable, the connection lugs are preferably made of the same material, particularly in the contact area, as the cables extending therefrom, which are in particular made of copper. This has the advantage that the transition resistances between the connection lugs and the cables arranged thereon are low, since copper has electrical advantages over aluminum in positive joining processes.

According to one embodiment, it is proposed that at least one of the connection lugs is arranged in a recess formed on the first surface of the flat conductor and that webs are formed on the flat conductor between the recesses. In a longitudinal profile of the flat conductor, the flat conductor may be formed in a stepped manner with recesses and webs (lands). The recesses can be formed by means of punching, pressing, milling, grinding or the like. The recesses preferably run transversely to the longitudinal direction, in particular perpendicularly to the longitudinal direction over the first surface of the flat conductor. Nevertheless, it is possible to arrange the recesses longitudinally or along the end face at one or both end edges of the flat conductor. In such an arrangement, it is preferred that the flat conductor to be welded also has at least one recess for the lugs to be arranged transversely in order to weld at least one connecting tab in the transverse direction and at least one connecting tab in the longitudinal direction on the flat part simultaneously.

The recesses preferably extend over the entire width of the flat conductor. The connection lugs can be arranged in the recesses. The extent of the recesses in the longitudinal direction of the flat conductor preferably corresponds approximately to the width of the connection lugs, so that the connection lugs can be inserted into the recesses, in particular in a clearance fit, transition fit or interference fit. Elevations, in particular recesses, are formed between the recesses.

As already explained, the recesses can be formed from the flat conductor, for example by non-cutting or cutting. However, it is also possible for plates forming the webs to be placed on the flat conductors next to the connection lugs. These plates have in particular a height which is equal to the height of the connection lugs. In particular, the plates have a width equal to the width of the flat conductor.

The friction stir welding joint zone can extend longitudinally along the flat conductor alternately into the connection lugs and the plates forming the webs. Thus, during friction stir welding, a joint can be formed between the connection lugs and the flat conductor as well as the plates and the flat conductors.

According to one embodiment, it is proposed that the connection lugs rest on the flat conductor with a first surface and are planar with the webs with a second surface opposite to the first surface. In particular, the depth of the recesses corresponds to the material thickness of the connection lugs, so that when the connection lugs are inserted into the recesses, they are planar with the surface of the webs. Thus, after friction stir welding, a uniform first surface of the flat conductor is formed intermittently from the connection lugs and the webs.

According to one embodiment, it is proposed that at least one of the connection lugs has a first end face flush with a first longitudinal edge of the flat conductor and a second end face projecting beyond a second longitudinal axis of the flat conductor opposite the first longitudinal axis. Also, a connection tab may rest on the flat conductor with an overlap area and project beyond a respective longitudinal edge of the flat conductor on both sides of the overlap area. The width of the connection tab can be smaller, equal to or greater in the overlap region than in at least one region projecting beyond a longitudinal edge, in particular a contact region and/or profiled region.

In the region of the projecting end faces, the connection lug can have a contact region, in particular in the form of a connection hole, a connection bolt, a crimp connection, a welded or soldered connection or the like.

The connection lug can be bare, bimetallic or coated and, in the region of overlap with the flat conductor, be bare or formed from a first metal material or be coated and, in a region in which the connection lug projects beyond the second longitudinal edge, be bare, bimetallic or formed from a second metal material or be coated.

According to one embodiment, it is proposed that the in particular less solid material, such as the flat conductor made of e.g. aluminum material, is continuously plasticized over its entire material thickness in the friction stir welding joint zone and that the in particular more solid material, such as connection lugs made of e.g. copper material, is only partially plasticized in the friction stir welding joint zone. In friction stir welding, the flat conductor is preferably plasticized over its entire material thickness. The connection lugs, on the other hand, only have to be at least partially plasticized, since a material bond only has to be formed in the area of the transition between the connection lug and the flat conductor. The connection lugs can also plasticize over the entire material thickness and the flat conductor only partially. In this case, the friction stir welding tool is applied to the surface of the connection lugs. This applies in particular should the flat conductor be formed from a material with higher strength than the strength of the material of the connection lugs.

According to an embodiment example, it is proposed that the friction stir welding joint zone has a width transverse to its longitudinal extension which corresponds at least to the material thickness of the connection lugs. In this context, the rod or pin of the friction stir welding tool is preferably formed with a diameter that corresponds to at least 50% of the material thickness of the connection lugs. Due to the electrical properties, it is preferred that the material thickness of the connection lug substantially matches the diameter of the rod or pin of the friction stir welding tool. It is possible for the diameter of the rod or pin of the friction stir welding tool to be up to 90% of the material thickness, but at least 50% of the material thickness. This forms a sufficiently large joining zone.

According to one embodiment, it is proposed that the friction stir weld joint zone extends continuously along the longitudinal axis of the flat conductor over at least two connecting lugs. Thus, there is only one plunge and one exit point within a weld, which can be regarded as weak points, with all other areas having the same joining quality. However, two or more of these welds are possible side by side along the longitudinal axis, each connecting two connecting lugs to the flat part.

BRIEF DESCRIPTION OF THE DRAWINGS

In the following, the subject matter is explained in more detail with reference to drawings showing examples of embodiments. The drawings show:

FIG. 1a, b Flat conductors according to embodiments;

FIG. 2 a-d Connection lugs according to embodiments;

FIG. 3 a flat conductor with welded-on connection lugs according to embodiments;

FIG. 4a-c views of a connection arrangement according to embodiments;

FIG. 5a, b a schematic representation of a method for manufacturing a connection arrangement according to embodiments.

DETAILED DESCRIPTION OF SPECIFIC EMBODIMENTS

Figure 6:
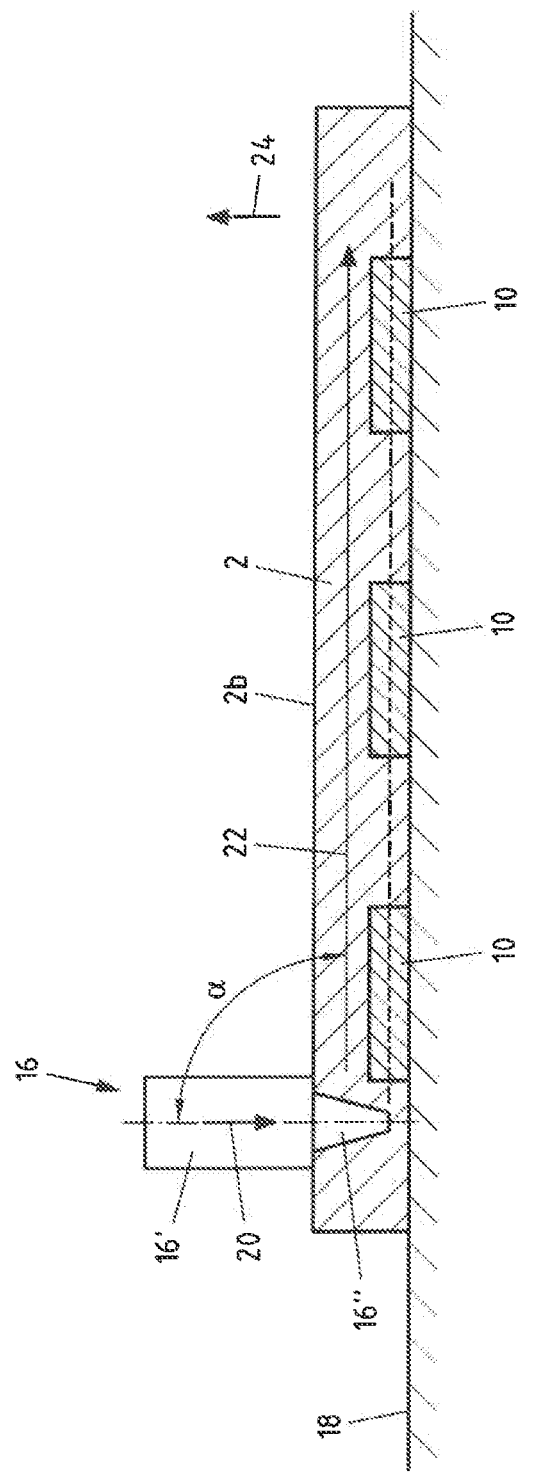
FIG. 6 a schematic representation of a method for manufacturing a connection arrangement according to embodiments.

FIG. 1 shows a flat conductor 2. The flat conductor 2 extends along its longitudinal axis 4 and has a cross-sectional profile transverse to the longitudinal axis 4, which is substantially rectangular. The flat conductor 2 has two opposing broad surfaces 2a, 2b extending parallel to each other, each bounded by longitudinal edges 2c.

The flat conductor 2 according to FIG. 1a has flat, wide surfaces 2a, b. As can be seen in FIG. 1b, one of the wide surfaces 2a, b may be formed with recesses 6 and webs (ridges) 8. The wide surface 2a with recesses 6 and webs 8 may be considered a first surface, and the wide surface 2b opposite thereto may be flat and considered a second surface.

The recesses 6 may be formed from the wide surface 2a by over-milling, upsetting, sawing, cutting, for example water cutting, laser cutting or the like. It is also possible for plate-shaped elements to be placed on the wide surface 2a as webs 8. The recesses 6 and webs 8 alternate with each other. The longitudinal extension 6' of a recess 6 along the longitudinal axis 4 can correspond to a width of a connection tab. Connecting lugs and plates as webs 8 can be alternately placed on the flat conductor 2.

The flat conductor 2 and, if applicable, the material of the webs 8 may be, for example, aluminum or an aluminum alloy. However, it is also possible that copper or a copper alloy is used.

Connection lugs 10 are placed on the flat conductor 2, as shown in FIGS. 2a-c.

FIG. 2a shows a connection lug 10 formed from a sheet metal. For example, the connection lug 10 may be stamped or cut from a sheet metal. The connection lug 10 may be formed from copper or copper alloy, but it is also possible that the connection lug 10 is formed from aluminum or aluminum alloy. The connection tab 10 may also be formed bimetallically, wherein a first region 10a may be formed of a first metallic material and second region 10b may be formed of a second metallic material, or may be fully or selectively coated. The metallic materials may be in accordance with the above-mentioned materials.

In the connection lug 10 according to FIG. 2a, a connection bolt 12a is provided in the region 10b.

In contrast to FIG. 2a, the connection lug 10 according to FIG. 2b is provided with a through hole 12b in the area 10b.

The connection lug 10 can also be formed as a bent part, as shown in FIG. 2c. In FIG. 2c, the region 10b is shown to be bent relative to the region 10a. In particular, a right-angled bend of the connection tab 10 may be formed.

The connection tab 10 can also be formed as a profiled flat part as shown in FIG. 2d. In an overlap region 10a, the connection tab 10 may be flat. In a contact area 10c, the connection tab 10 may be coated or bare for welding or soldering to a conductor of a cable. In a profiled area 10b, the connection tab 10 may have an arcuate trough into which a cable, in particular an insulation of a cable, can be inserted.

The connection lugs 10 are placed next to each other, spaced apart from each other, on the flat conductor 2, as can be seen in FIG. 3. Here, the flat conductor 2 is equipped with three connection lugs 10, which are placed on the flat conductor at a distance from each other. In FIG. 3, it is optionally shown that the flat conductor 2 is formed with recesses 6 and webs 8. The webs 8 space the connection lugs 10b from each other. To form a Connection arrangement, it is now proposed that a continuous friction stir weld joint zone 14 extending along the longitudinal axis 4 of the flat conductor 2 over a plurality of connecting lugs 10 is formed.

FIG. 4a shows the flat conductor 2 from the broad surface 2b. It can be seen that a friction stir weld zone 14 extending along the longitudinal axis is formed starting from the wide surface 2b. The connection lugs 10 are placed on the surface 2a of the flat conductor 2 opposite the wide surface 2b. The friction stir weld joint zone 14 extends through the entire flat conductor 2 into the connection lugs 10. This can be seen well in FIG. 4b.

FIG. 4b shows a longitudinal section of the flat conductor 2. It can be seen that, starting from the wide surface 2b towards the wide surface 2a, the friction stir weld joint zone 14 extends through the flat conductor into the connection lugs 10. The friction stir weld joint zone 14 can also extend into the webs 8, which are formed from plate-shaped elements, for example. The friction stir weld joint zone 14 is a continuous joint zone extending longitudinally along the longitudinal axis 4 of the flat conductor 2 through a plurality of connection lugs 10.

FIG. 4c shows the Connection arrangement as viewed from the broad surface 2a. It can be seen that the connection lugs 10 are applied to the wide surface 2a with a first end face 10' aligned with a longitudinal axis 4 of the flat conductor 2. The connecting lugs 10 extend beyond the opposite longitudinal edge 2c of the flat conductor 2. The friction stir weld joint zone 14 extends along the longitudinal axis 4 of the flat conductor over a plurality of connecting lugs 10 and runs continuously straight along the flat conductor 2. With the aid of the friction stir weld joint zone, the connecting lugs 10 are joined to the flat conductor 2 in a uniform joining process.

FIG. 5a shows the flat conductor 2 from the wide surface 2b. It can be seen that two friction stir weld joint zones 14', 14" are formed starting from the wide surface 2b and extending in the longitudinal axis. On the surface 2a of the flat conductor 2 opposite the wide surface 2b, two connection lugs 10 are placed for each of the joining zones 14', 14". The friction stir welding joining zones 14', 14" extend through the entire flat conductor 2 into the connecting lugs 10. The connection lugs 10 in a joining zone 14' can project beyond one or both longitudinal edges 2c, as can be seen on the left. The connection lugs 10 in a joining zone 14" can project beyond only one longitudinal edge 2c, as can be seen on the right.

FIG. 5b shows the flat conductor 2 from the wide surface 2b. It can be seen that a friction stir weld joint zone 14 extending in the longitudinal axis is formed starting from the wide surface 2b. On the surface 2a of the flat conductor 2 opposite the wide surface 2b, three (of which any two can be selected) connection lugs 10 are placed, by way of example. The friction stir weld joint zone 14 extends through the entire flat conductor 2 into the connection lugs 10. A connection tab 10 may extend beyond an end edge 2d of the flat member 2, as can be seen on the left. A connection tab 10 may protrude beyond a longitudinal edge 2c of the flat member 2, as can be seen centrally. A connection tab 10 can project beyond both longitudinal edges 2c of the flat part 2, as can be seen on the right.

For this purpose, as shown schematically in FIG. 6, a friction stir welding tool 16 is pressed onto the wide surface 2b. In the process, a shank 16' presses the flat conductor 2 against a work plate 18 and jams the connection lugs 10 between the work plate 18 and the flat conductor 2. Either the entire friction stir welding tool 16 or merely the friction stir welding pin 16" is driven into the flat conductor 2 in an oscillating or rotating manner in a direction 22 at an angle a 90° to the surface 2b.

Due to the high pressure of the shaft 16' and/or the oscillating movement of the tool 16, the material of the flat conductor 2 is plasticized. Furthermore, the oscillating movement of the pin 16" or the entire tool 16 agitates the material of the flat conductor 2. The pin 16" penetrates the flat conductor 2 to such an extent that the material of the connection lugs 10 is also partially plasticized and stirred with the plasticized material of the flat conductor.

During this welding, the friction stir welding tool 16 is moved through the flat conductor 2 along the direction of movement 22, which is parallel to the longitudinal axis 4, the friction stir welding joining zone 14 being formed along the direction of movement 22.

At the end of the welding process, the pin 16" is moved out of the material of the flat conductor 2 in the direction 24. In the course of the process, a friction stir weld joint zone 14 is formed by the flat conductor 2 and parts of the connection lugs 10.

LIST OF REFERENCE SIGNS

2 Flat conductor
2a, b Wide surfaces
2c Longitudinal edge
2d End edge
4 Longitudinal axis
6 Recess
6' Longitudinal extension
8 Web
10 Connection lug
10a, b Area
12a Bolt
12b Through hole
14, 14', 14" Friction stir weld joining zone
16 Friction stir welding tool
16' Shank
16" Pin
18 Work plate
20-24 Direction of movement

What is claimed is:
1. Connection arrangement comprising:
a metallic flat conductor having an at least quadrangular cross-sectional profile and at least two opposing first and second surfaces extending at least partially parallel to one another in the longitudinal direction; and at least two connecting lugs, which rest on the first surface with an overlap and project beyond at least one edge of the flat conductor, wherein a metallic friction stir weld joint zone is formed extending from the second surface through the flat conductor to the first surface and projecting into the connection lugs, and wherein the friction stir weld joint zone is formed from material of the flat conductor and of the connection lugs which has been plasticized during a joining operation.

2. Connection arrangement of claim 1, wherein the friction stir weld joint zone is formed in the flat conductor continuously via at least two connection lugs along the longitudinal axis of the flat conductor, in particular in that two separate friction stir weld joint zones are formed along the longitudinal axis of the flat conductor, each with at least two connection lugs.

3. Connection arrangement of claim 1, wherein the flat conductor is plasticized continuously along its longitudinal axis along the friction stir weld joining zone during the joining operation, and the connecting lugs abut against the flat conductor in the joining zone at intervals from one another.

4. Connection arrangement of claim 1, wherein the flat conductor is formed from an aluminum material or a copper material and/or in that the connection lugs are formed from an aluminum material or a copper material.

5. Connection arrangement of claim 1, wherein the friction stir weld joint zone is formed from a copper material or an aluminum material, in particular wherein an intermetallic phase is formed in the friction stir weld joint zone between the materials of the flat part and the connecting lugs.

6. Connection arrangement of claim 1, wherein the flat conductor and the connecting lugs are formed from mutually different metallic materials, in particular in that the flat conductor is formed from a less strong, in particular less compression-resistant material than the connecting lugs.

7. Connection arrangement of claim 1, wherein at least one of the connecting lugs has a first end face flush with a first longitudinal edge of the flat conductor and a second end face projecting beyond a second longitudinal edge of the flat conductor opposite the first longitudinal edge, or in that at least one of the connecting lugs has a first end face projecting beyond a first longitudinal edge of the flat conductor and a second end face projecting beyond a second longitudinal edge of the flat conductor opposite the first longitudinal edge, or in that at least one of the connecting lugs has a first end face projecting beyond an end edge of the flat conductor.

8. Connection arrangement of claim 1, wherein the flat conductor is continuously plasticized over its entire material thickness in the friction stir weld joining zone, and in that the connection lugs are only partially plasticized in the friction stir weld joining zone.

9. Connecting arrangement of claim 1, wherein the friction stir weld joining zone has a width transverse to its longitudinal extent which corresponds to at least 50% of the material thickness of the flat parts.

10. Connection arrangement of claim 1, wherein the friction stir weld joint zone extends continuously along the longitudinal axis of the flat conductor.

11. Connection arrangement of claim 1, wherein at least one of the connection lugs is arranged in a recess formed on the first surface of the flat conductor, and in that webs are formed between the recesses.

12. Connection arrangement of claim 11, wherein the recess of the first surface of the flat conductor is formed out of the material of the flat conductor or that plates forming the webs are placed on the flat conductor.

13. Connection arrangement of claim 11, wherein the connection lugs rest on the flat conductor with a first surface and are planar with the recesses with a second surface opposite the first surface.

14. Method of manufacturing a connection arrangement comprising the steps of:

providing a metallic flat conductor having an at least quadrangular cross-sectional profile and at least two opposing first and second surfaces extending at least partially parallel to one another in the longitudinal direction;

placing at least two connecting lugs with an overlap on the first surface of the flat conductor so that the connecting lugs project beyond at least one of the edges of the flat conductor;

joining the flat conductor to the connection lugs through the flat conductor by friction stir welding, wherein a friction stir weld joint zone is formed extending from the second surface through the flat conductor to the first surface and into the connection lugs, and wherein the friction stir weld joint zone is formed from material of the flat conductor and of the connection lugs which is plasticized during the joining operation.

\* \* \* \* \*